United States Patent
Kikuichi

(10) Patent No.: US 7,923,891 B2
(45) Date of Patent: Apr. 12, 2011

(54) STATOR FOR ELECTRIC ROTATING MACHINE

(75) Inventor: Yoshihide Kikuichi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 40 days.

(21) Appl. No.: 12/554,168

(22) Filed: Sep. 4, 2009

(65) Prior Publication Data
US 2010/0244618 A1    Sep. 30, 2010

(30) Foreign Application Priority Data

Mar. 25, 2009   (JP) .................................. 2009-073060

(51) Int. Cl.
*H02K 1/06* (2006.01)
(52) U.S. Cl. .................................. 310/216.129; 310/431
(58) Field of Classification Search ........... 310/216.129, 310/431, 432, 433, 254.1
See application file for complete search history.

(56) References Cited

U.S. PATENT DOCUMENTS

| | | | | | |
|---|---|---|---|---|---|
| 3,876,893 | A | * | 4/1975 | Ross | 310/216.008 |
| 3,987,325 | A | * | 10/1976 | Wilson et al. | 310/256 |
| 4,469,973 | A | * | 9/1984 | Guyot et al. | 310/433 |
| 7,714,477 | B2 | * | 5/2010 | Nagashima et al. | 310/216.129 |

FOREIGN PATENT DOCUMENTS

JP   3-28903 B2   4/1991

* cited by examiner

*Primary Examiner* — Nguyen N Hanh
(74) *Attorney, Agent, or Firm* — Buchanan Ingersoll & Rooney PC

(57) ABSTRACT

A stator for an electric rotating machine has iron core fastening members on the outer circumferential surface of a stator iron core, spaced apart from one another in a circumferential direction and fastened to the iron core in an axial direction. Holding rings on the outer circumferential surface of the iron core, spaced apart from one another in the axial direction, press the iron core toward a center portion thereof via the iron core fastening members. Ring-shaped inner frame members protrude from the inner surface of a frame that encloses the iron core, and are spaced apart from one another in the axial direction. Elastic supporting members are fixed to the inner circumferential surfaces of the inner frame members that are adjacent to one another, and are fixed to the outer circumferential surfaces of the holding rings at the middle in the axial direction, or vice versa.

10 Claims, 5 Drawing Sheets

STATOR FOR ELECTRIC ROTATING MACHINE

BACKGROUND OF THE INVENTION

1. Field of the Invention

The present invention relates to a stator for an electric rotating machine, and more particularly to improvement of a structure for elastically supporting a stator iron core in a frame.

2. Description of the Related Art

Among electric rotating machines in which a stator iron core is elastically supported, by the intermediary of iron core supporting plates, by a plurality of spring rods arranged in the axis direction of the stator iron core on a circumference in the vicinity of the outer circumferential surface of the stator iron core, there exists an electric rotating machine having a conventional stator, for the electric rotating machine, in which screen plates are provided at positions facing the outer circumferential surfaces of the respective iron core supporting plates, and there is provided a bending prevention means that forms, between the iron core supporting plate and the screen plate, a predetermined gap for suppressing eternal deformation due to twisting caused by the bending stress from the spring rod and the rotation-direction excessive torque (e.g., refer to Japanese Examined Patent Publication (Kokoku) No. H3-28903 (Page 2, FIG. 1)).

In such a conventional stator for an electric rotating machine as described above, the bending prevention means can prevent eternal deformation due to the excessive torque; however, because the screen plates are provided at positions facing the respective outer circumferential surfaces of the stator supporting plates, there has been a problem that the outer diameter of a frame becomes large. Moreover, because the stator iron core is elastically supported by the spring rods, a great number of spring rods are required in the circumferential direction, in order to distribute the weight such as the gravity of the stator iron core and the rotation torque in the circumferential direction; therefore, there has been a problem that increase in the number of components requires more time for assembly work.

SUMMARY OF THE INVENTION

The present invention has been implemented in order to solve the foregoing problems in the conventional technology; the objective thereof is to obtain a stator, for an electric rotating machine, that makes it possible to reduce the diameter of the stator frame and to decrease the number of components needed to distribute the weight.

A stator for an electric rotating machine, according to the present invention, is provided with a plurality of iron core fastening members that are provided on the outer circumferential surface of a stator iron core in such a way as to be spaced a predetermined distance apart from one another in a circumferential direction of the stator and fasten the stator iron core in an axis direction of the stator; a plurality of holding rings that are provided on the outer circumferential surface of the stator iron core in such a way as to be spaced a predetermine distance apart from one another in the axis direction and hold the stator iron core as if to press the stator iron core toward a center portion thereof by the intermediary of the iron core fastening members; a plurality of ring-shaped inner frame members that are protrusively provided on the inner surface of a frame that encloses the stator iron core, in such a way as to be spaced a predetermined distance apart from one another in the axis direction; and a plurality of elastic supporting members that are each fixed to the inner circumferential surfaces of the inner frame members that are adjacent to one another, and that are each fixed to the outer circumferential surfaces of the holding rings at the middle in the axis direction, or that are each fixed to the outer circumferential surfaces of the holding rings that are adjacent to each other, and that are each fixed to the inner circumferential surfaces of the inner frame members at the middle in the axis direction.

In the present invention, the elastic supporting members are each fixed to the inner circumferential surfaces of the inner frame members that are adjacent to one another, and that are each fixed to the outer circumferential surfaces of the holding rings at the middle in the axis direction, or that are each fixed to the outer circumferential surfaces of the holding rings that are adjacent to each other, and that are each fixed to the inner circumferential surfaces of the inner frame members at the middle in the axis direction; therefore, not only can the size of an electric rotating machine be reduced, but also the foregoing configuration enables the weight to be readily distributed and the number of components to be decreased.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 1(a) is a cross-sectional view, and FIG. 1(b) is a longitudinal cross-sectional view; in addition, FIG. 1(a) corresponds to a cross-sectional view taken along the line "Ia-Ia" in FIG. 1(b);

FIG. 2(a) is a cross-sectional view, and FIG. 2(b) is a longitudinal cross-sectional view;

FIG. 3(a) is a cross-sectional view, and FIG. 3(b) is a longitudinal cross-sectional view;

FIG. 4(a) is a cross-sectional view, and FIG. 4(b) is a longitudinal cross-sectional view;

FIG. 5(a) is a cross-sectional view, and FIG. 5(b) is a longitudinal cross-sectional view;

FIG. 9(a) is a transverse cross-sectional view, and FIG. 9(b) is a longitudinal cross-sectional view.

DETAILED DESCRIPTION OF THE PREFERRED EMBODIMENTS

Embodiment 1

Figure 1:
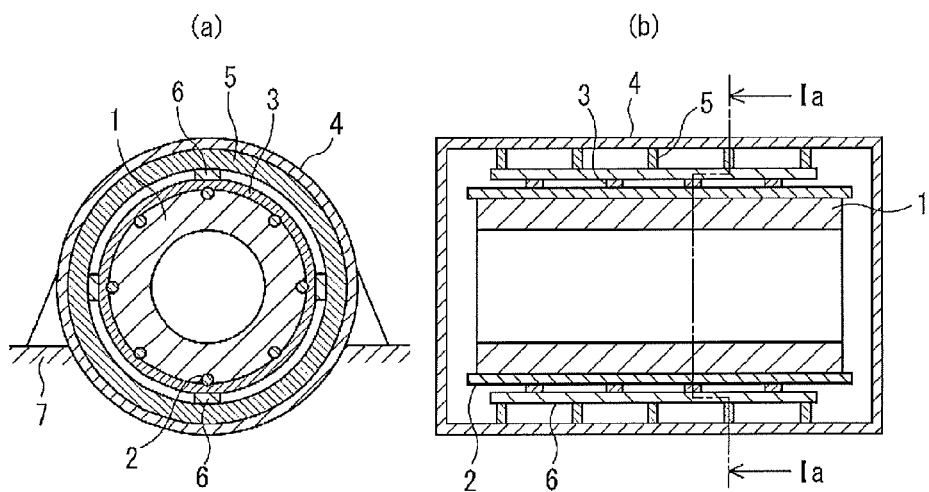
FIG. 1 is a set of views symbolically illustrating the principal parts of a stator for an electric rotating machine according to Embodiment 1 of the present invention.

A stator for an electric rotating machine according to Embodiment 1 of the present invention will be explained below with reference to FIG. 1. In FIG. 1, a stator for an electric rotating machine is provided with a cylindrical stator iron core 1; a plurality of (eight, in this example) iron core fastening members 2 that are provided spaced a predetermine distance apart from one another in the circumferential direction on the outer circumferential surface of the stator iron core 1 and screw the stator iron core 1 in the axis direction (a direction in parallel with the axis of the stator iron core 1); a plurality of (four, in this example) axis-direction-flattened holding rings 3 that are provided spaced a predetermine distance apart from one another in the axis direction on the outer circumferential surface of the stator iron core 1 and hold the stator iron core 1 as if to press the stator iron core 1 toward its center portion by the intermediary of the iron core fastening members 2; a cylindrical frame 4 that encloses the stator iron core 1 without making contact with the stator iron core 1; a plurality of (five, in this example) ring-shaped inner frame members 5 that are provided inside the frame 4 in a protruding manner toward the axis center and are spaced a predetermined distance apart from one another in the axis direction; a plurality of (four, in this example) elastic supporting members 6, formed of a spring plate, each one of which is fixed to the inner frame members 5 and fixed to the holding rings 3 at the axis-direction center portion thereof; and the like.

The stator illustrated in FIG. 1 is included, for example, in the armature of a turbine generator; in the inner circumferential surface of the stator iron core 1, there are provided in the circumferential direction a predetermined number of slots formed in the axis direction, and a stator coil is disposed in the slots. The portion, of the iron core fastening member 2, which penetrates the stator iron core 1 is formed in such a way as to have a trapezoidal cross section, and the protrusion portions at both ends thereof are formed in such a way as to have a circular cross section; a screw is screwed in the outer circumferential surface portion of the iron core fastening member 2; the stator iron core 1 is pressed by large nuts from both sides thereof toward the center axis, by the intermediary of a ring-shaped press plate. Because being the same as those of a stator according to a conventional technology, these constituent components are not illustrated. At axis-direction both ends of the frame 4, there are provided fixing portions for bearing devices that support an unillustrated rotor shaft. Additionally, the lower side of the frame 4 is firmly fixed to a basis 7.

The holding ring 3 is formed in a flat shape in which the dimension in the axis direction is larger than the dimension in the radial direction; before being screwed, the holding ring 3 consists of two divided parts, e.g., the upper and lower parts; after being tightened with an unillustrated tightening tool, each part is joined with the iron core fastening member 2 through welding. The elastic supporting member 6 is formed in such a way as to have a rectangular cross section in which the thickness in the circumferential direction is made large in order to support the weight and the rotation torque of the stator iron core 1, and the thickness in the radial direction perpendicular to the circumferential direction is made small in order to prevent the radial-direction vibration of the stator iron core 1 from being transmitted to the inner frame member 5. In addition, in Embodiment 1, the elastic supporting member 6 is formed of a long spring plate that is continuously elongated in the axis direction from the inner frame member 5 at one axis-direction end thereof to the inner frame member 5 at the other axis-direction end.

The pitch of the inner frame members 5 and the pitch of the holding rings 3 are almost the same, and each holding ring 3 is situated at the middle position of the pitch width between the adjacent inner frame members 5. The elastic supporting member 6 is joined with the outer circumferential surface of the holding ring 3 configured in such a way as described above, through welding or by means of a bolt, and also joined with the inner circumferential surface of the inner frame member 5, through welding or by means of a bolt. In Embodiment 1, due to the configuration described above, the junction position where the elastic supporting member 6 and the holding ring 3 are joined with each other is located in the vicinity of the middle position of the pitch width between the inner frame members 5, so that the bending rigidity is reduced.

Next, the operation of Embodiment 1 configured as described above will be explained. The static load, short-circuit torque due to a short-circuit accident during operation, and the like of the stator iron core 1 are transmitted to the elastic supporting member 6, by the intermediary of the holding ring 3 welded with the iron core fastening member 2. The elastic supporting member 6 is joined with the inner frame members 5 welded with the frame 4 in the axis direction of the frame 4; the static load is supported as it is transmitted from the elastic supporting member 6 to the frame 4 via the inner frame member. Additionally, vibration that occurs in the radial direction during operation is absorbed by bending of the elastic supporting member 6 whose supporting length is the axis-direction pitch width between the adjacent inner frame members 5 or the axis-direction pitch width between the adjacent holding rings 3.

As described above, in Embodiment 1, there is mounted no component that restricts the shape of the inner frame member 5; the elastic supporting member 6 is formed of a spring plate and joined with the outer circumferential surfaces of the flat holding rings 3 as well as with the inner circumferential surfaces of the inner frame members 5. As a result, there can be obtained a stator, for an electric rotating machine, in which the diameters of the inner frame member 5 and the frame 4 are reduced. Moreover, because the stator iron core 1 is joined with the spring-plate elastic supporting member 6 by the intermediary of the holding rings 3, the load is distributed to the iron core fastening members 2 arranged in the circumferential direction; therefore, the stator can be designed in such a way as to have a less number of elastic supporting members 6 provided in the circumferential direction, and hence is economical. Still moreover, a less number of elastic supporting members 6 are provided, the working time for assembly can be shortened.

Embodiment 2

Figure 2:
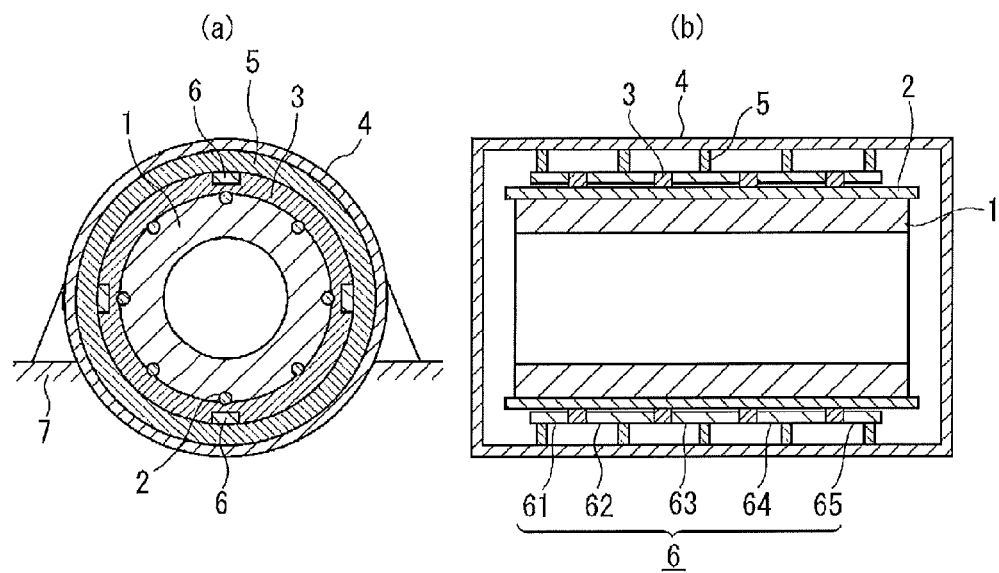
FIG. 2 is a set of views symbolically illustrating the principal parts of a stator for an electric rotating machine according to Embodiment 2 of the present invention.

Next, a stator for an electric rotating machine according to Embodiment 2 of the present invention will be explained with reference to FIG. 2. In addition, the same reference characters in figures denote the same or equivalent constituent elements. In FIG. 2, a holding ring 3 is the same or slightly larger than the holding ring 3 in Embodiment 1 in the radial-direction cross-sectional size; the cross section thereof is almost square. An elastic supporting member 6 is divided into elastic supporting members 61 to 65 arranged in the axis direction; each of the divided elastic supporting members 62 to 64 is disposed at the outer surface side that is situated between the side faces, of the adjacent holding rings 3, which face each other in the axis direction, and is joined, through welding or by means of a bolt, with the side faces, of the adjacent holding rings 3, which face each other. Each of the elastic supporting members 61 and 65 at both ends in the axis direction is constructed in the manner of a cantilever and is joined with the outer surface of the holding ring 3 through welding or by means of a bolt. As is the case with Embodiment 1, each of the elastic supporting members 61 to 65 is joined with the inner circumferential surface of the inner frame member 5 through welding or by means of a bolt. The other configurations are the same as those in Embodiment 1.

In Embodiment 2 configured as described above, because the arrangement and configuration of the holding rings 3, the elastic supporting members 6, and the inner frame members 5 are almost the same as those in Embodiment 1, the same effect as that in Embodiment 1 can be obtained; moreover, because each of the elastic supporting members 61 to 65 is joined with the outer surfaces of the holding rings 3, there is obtained an effect that the diameter of the stator can be made smaller than Embodiment 1 by approximately the thickness of the elastic supporting member 6.

Embodiment 3

Figure 3:
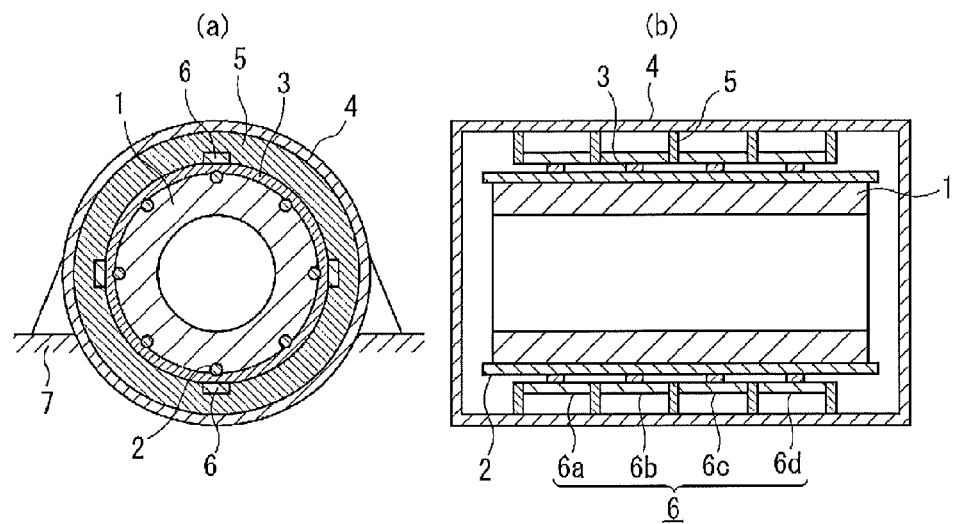
FIG. 3 is a set of views symbolically illustrating the principal parts of a stator for an electric rotating machine according to Embodiment 3 of the present invention.

Next, a stator for an electric rotating machine according to Embodiment 3 of the present invention will be explained with reference to FIG. 3. In FIG. 3, an elastic supporting member 6 is divided into elastic supporting members 6a to 6d arranged in the axis direction; each of the divided elastic supporting members 6a to 6d is disposed at the inner surface side that is situated between the side faces, of the adjacent inner frame members 5, which face each other in the axis direction, and is joined, through welding or by means of a bolt, with the side faces, of the adjacent inner frame members 5, which face each other. As is the case with Embodiment 1, each of the elastic supporting members 6a to 6d is joined with the outer circumferential surface of the holding ring 3.

In Embodiment 3 configured as described above, because the elastic supporting members 6a to 6d are separately arranged in such a way as to be inserted between the adjacent inner frame members 5 that face each other in the axis direction, there is obtained a further effect that the diameter of the stator can be made smaller than Embodiment 1 by the thickness of the elastic supporting member 6.

Embodiment 4

Figure 4:
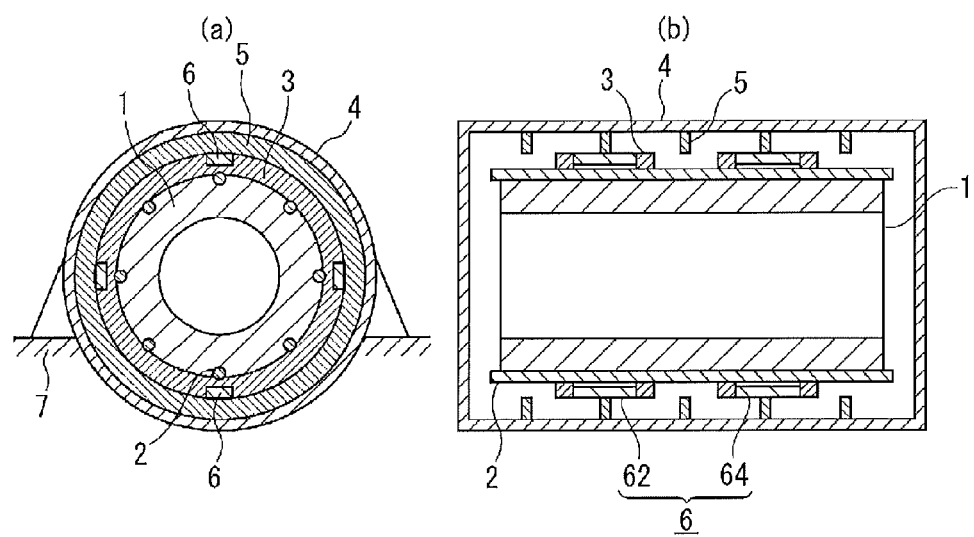
FIG. 4 is a set of views symbolically illustrating the principal parts of a stator for an electric rotating machine according to Embodiment 4 of the present invention.

Next, a stator for an electric rotating machine according to Embodiment 4 of the present invention will be explained with reference to FIG. 4. In FIG. 4, an elastic supporting member 6 is divided in the axis direction; each of the divided elastic supporting members is disposed at the outer circumferential surface side that is situated at the left or right space, in FIG. 4, among the spaces between the side faces, of the adjacent holding rings 3, which face each other in the axis direction, and is joined, through welding or by means of a bolt, with the side faces, of the adjacent holding rings 3, which face each other. In addition, Embodiment 4 corresponds to a stator for an electric rotating machine in which the elastic supporting members 62 and 64, in Embodiment 2, divided in the axis direction are left as they are and the other elastic supporting members 61, 63, and 65 are omitted. As a result, the elastic supporting member 6 is arranged continually in the axis direction; the remaining elastic supporting members 62 and 64 are each fixed at a place between the adjacent holding rings 3 and fixed to the inner frame member 5 at the middle thereof. The other configurations are the same as those in Embodiment 2.

In Embodiment 4 configured as described above, as many divided elastic supporting members as required among the divided elastic supporting members 61 to 65 (in FIG. 2) are left at necessary places, as far as the strength and the spring rigidity allow; therefore, the number of elastic supporting members 6 in the axis direction can be optimized. In addition, the axis-direction positions where the divided elastic supporting members 62 and 64 are arranged are common to the four longitudinal lines. The arrangement may be changed, as may be necessary; for example, with regard to the left and right longitudinal lines in FIG. 4(a), as is the case with Embodiment 2, the divided elastic supporting members 61 to 65 are arranged in series in the axis direction, and then the elastic supporting members 61, 63, and 65 or 62, 63, and 64 are left.

Embodiment 5

Figure 5:
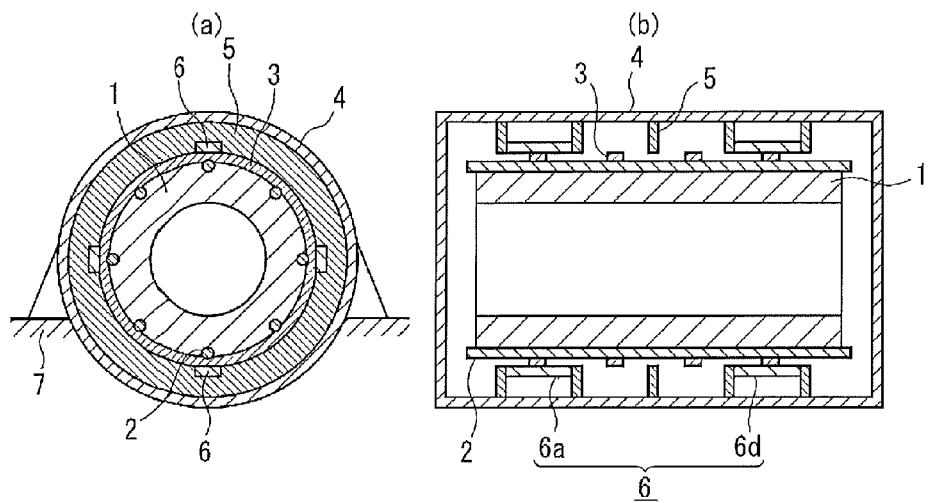
FIG. 5 is a set of views symbolically illustrating the principal parts of a stator for an electric rotating machine according to Embodiment 5 of the present invention.

Next, a stator for an electric rotating machine according to Embodiment 5 of the present invention will be explained with reference to FIG. 5. In FIG. 5, an elastic supporting member 6 is configured in such a way as to correspond to a shape obtained by removing the divided elastic supporting members 6b and 6c arranged in the middle portion of the stator, according to Embodiment 3, illustrated in FIG. 3(b). The other configurations are the same as those in Embodiment 3.

In Embodiment 5 configured as described above, there are provided a portion where no divided elastic supporting member is disposed in the pitch spaces between the inner frame members 5; therefore, there can be expected an effect of vibration absorption through twisting of the inner frame members 5. Additionally, it goes without saying that the number of the elastic supporting members 6 can be optimized and the same effects as those of Embodiments 1 and 2 can be obtained.

Embodiment 6

Figure 6:
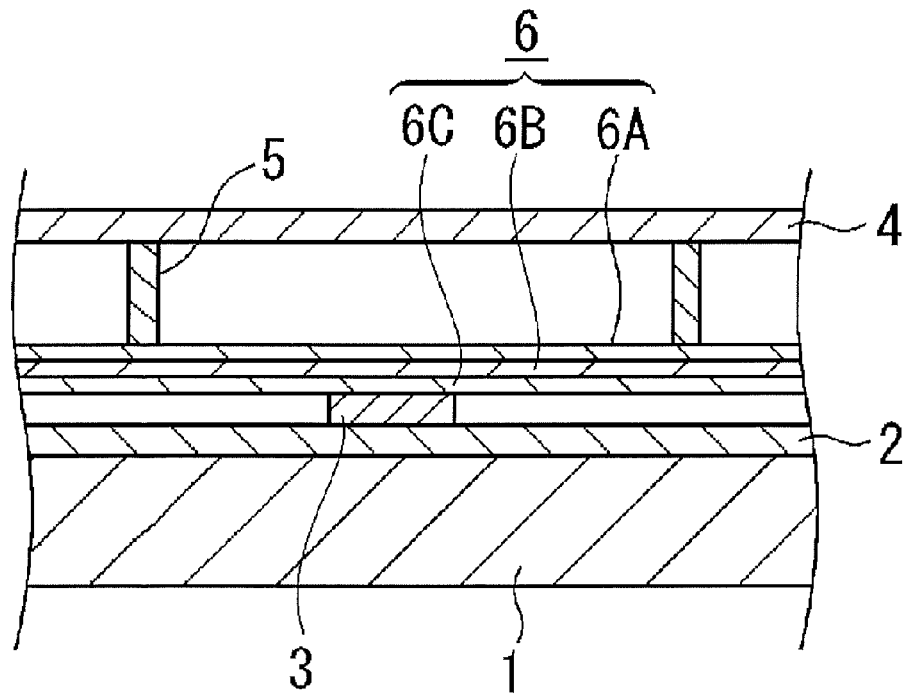
FIG. 6 is a partial longitudinal cross-sectional view symbolically illustrating the principal parts of a stator for an electric rotating machine according to Embodiment 6 of the present invention.

Next, a stator for an electric rotating machine according to Embodiment 6 of the present invention will be explained with reference to FIG. 6. In FIG. 6, an elastic supporting member 6 is formed of a laminate in which elastic supporting members 6A, 6B, and 6C made of a spring plate are stacked on top of the other in the radial direction. A plurality of the elastic supporting members 6A to 6C is integrally fixed to the inner frame members 5, for example, by screwing a bolt (unillustrated) through the elastic supporting member 6 from the outer side of the elastic supporting member 6C. On the other hand, the elastic supporting members 6 is fixed by welding only the elastic supporting member 6C, which makes contact with the holding ring 3, with the holding ring 3. A slippery material such as Teflon (registered trademark), a kind of elastic sheet, or the like may be inserted between the elastic supporting members abutting on each other in the laminating direction. The other configurations are the same as those in Embodiment 1.

In Embodiment 6 configured as described above, because there is utilized an elastic supporting member 6 in which elastic supporting members 6A, 6B, and 6C are stacked on top of the other in the radial direction, no shearing stress is not transmitted in the elastic supporting member 6; therefore, because spring rigidity in the radial direction is reduced, there is obtained an effect that vibration can be reduced more largely. In the case where a sheet made of a slippery or elastic material is inserted between the elastic supporting members, the vibration suppression effect is enhanced, whereby noise can also be reduced. In addition, the respective mechanical or physical characteristics and sizes (the thicknesses, i.e., the radial dimensions or the widths, i.e., the circumferential dimensions) of the elastic supporting members 6A, 6B, and 6C may be the same, or the elastic supporting members 6A, 6B, and 6C may be different from one another in at least one of the characteristic and the size.

Embodiment 7

Figure 7:
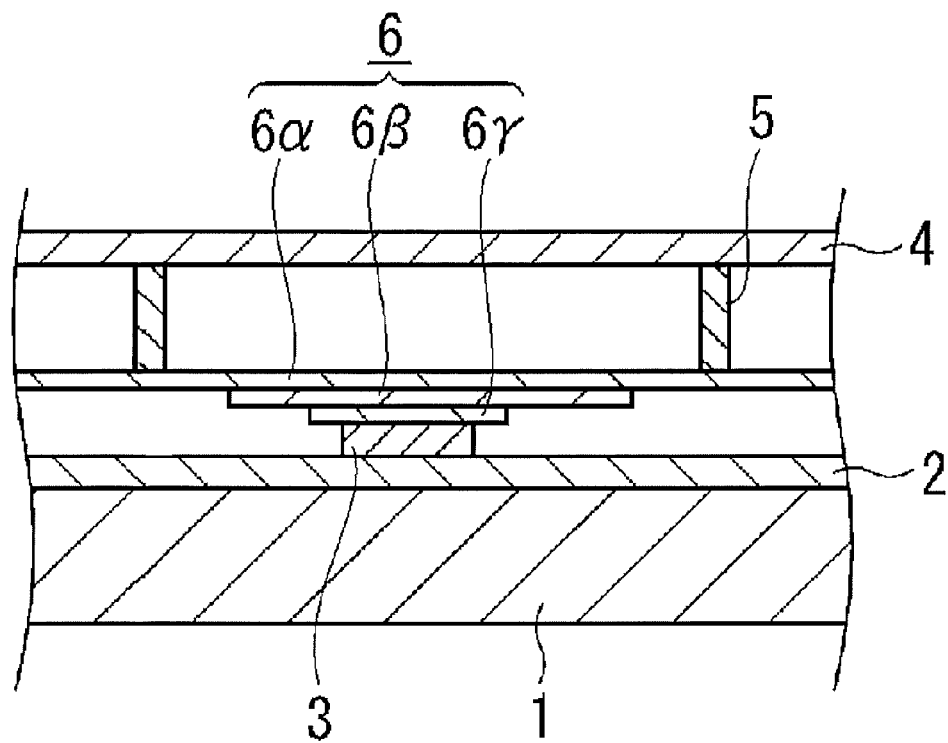
FIG. 7 is a partial longitudinal cross-sectional view symbolically illustrating the principal parts of a stator for an electric rotating machine according to Embodiment 7 of the present invention.

Next, a stator for an electric rotating machine according to Embodiment 7 of the present invention will be explained with reference to FIG. 7. An elastic supporting member 6, disposed in the vicinity of the outside (the upper portion in FIG. 7) of the stator, is formed of an elastic supporting member 6α, made of a long spring plate, that is elongated from one axis-direction end to the other axis-direction end of the inner frame member 5 and fixed to the inner circumferential surface of the inner frame member 5; an elastic supporting member 6β, made of a spring plate, that is stacked on the inner circumferential surface, of the elastic supporting member 6α, which faces the holding ring 3 and formed shorter than the distance between the axis-direction endfaces of the adjacent inner frame members 5; and an elastic supporting member 6γ, made of a short spring plate, that is inserted between the elastic supporting member 6β and the holding ring 3 and whose axis-direction length is shorter than the length of the elastic supporting member 6β.

The elastic supporting members 6α, 6β, and 6γ are joined with the holding ring 3 through welding or by means of a bolt at the middle portion between the adjacent inner frame members 5; however, the respective both axis-direction ends of the elastic supporting members 6β and 6γ are not restrained in the axis direction. All of the holding rings 3 are configured in the same manner, and the elastic supporting members 6 disposed at four positions in the circumferential direction are also configured in the same manner. In addition, as is the case with Embodiment 6, a slippery material, a kind of elastic sheet, or the like may be inserted between the elastic supporting members abutting on each other in the laminating direction. The other configurations are the same as those in Embodiment 1.

In Embodiment 7 configured as described above, because the elastic supporting members 6β and 6γ stacked on the inner circumferential surface of the elastic supporting member 6α are not fixed at the respective both ends in the axis direction, there exists no restraint caused by bending deformation at both the fixing portions of the spring plate; therefore, because spring rigidity is reduced, there is obtained an effect that vibration can be reduced more largely. In addition, in Embodiment 7, there has been described a case in which the elastic supporting member 6α that is elongated in the axis direction from the inner frame member 5 at one axis-direction end thereof to the inner frame member 5 at the other axis-direction end is fixed to the inner circumferential surface of the inner frame member 5; however, the stator may be configured in such a way that the elastic supporting member 6α is fixed to the outer circumferential surface of the holding ring 3, the elastic supporting members 6β and 6γ are reversely disposed in the direction facing the inner frame member 5, and the axis-direction middle portion thereof is joined with the inner frame member 5.

Embodiment 8

Figure 8:
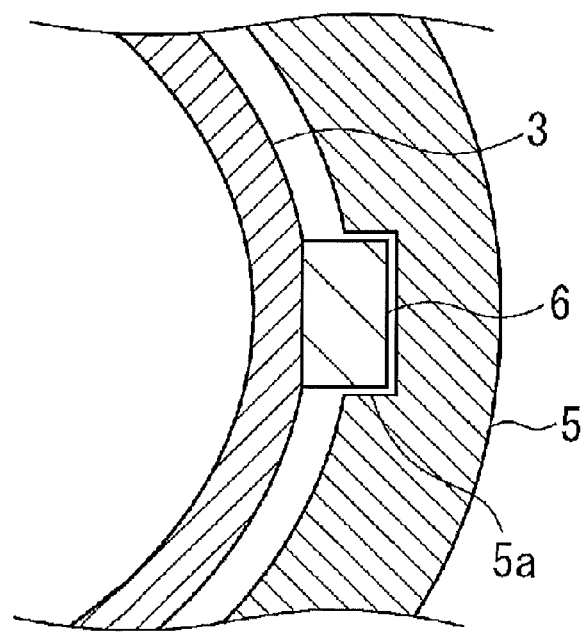
FIG. 8 is a partial transverse cross-sectional view symbolically illustrating the principal parts of a stator for an electric rotating machine according to Embodiment 8 of the present invention.

Next, a stator for an electric rotating machine according to Embodiment 8 of the present invention will be explained with reference to FIG. 8. In FIG. 8, in the inner circumferential surface of the inner frame member 5, there is provided a U-shaped cut 5a that contains part of the outer circumferential portion of the elastic supporting member 6. The U-shaped cut 5a is formed in such a way that the width thereof is slightly longer than the circumferential-direction dimension of the elastic supporting member 6; as illustrated in FIG. 8, part of the elastic supporting member 6 in the thickness direction thereof is inserted into the U-shaped cut 5a and fixed to the inner frame member 5 through welding or by means of a bolt. In addition, in FIG. 8, the stator iron core 1, the iron core fastening member 2, and the frame 4 are not illustrated. The other configurations are the same as those in Embodiment 1.

In Embodiment 8 configured as described above, because the U-shaped cut 5a provided in the inner circumferential portion of the inner frame member 5 contains part of the outer circumferential portion of the elastic supporting member 6, the diameter of the frame 4 of the stator can be reduced by the size of the part, of the elastic supporting member 6, that is contained by the U-shaped cut 5a.

Embodiment 9

Figure 9:
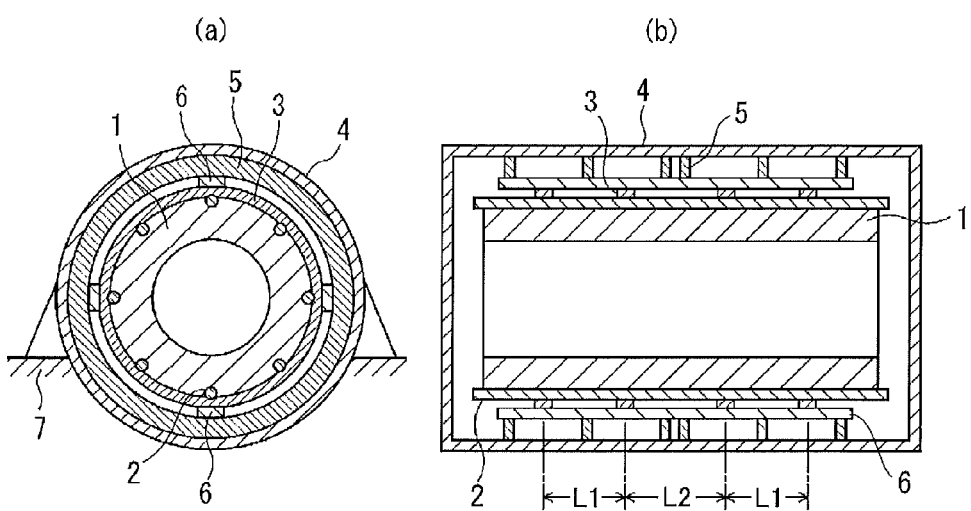
FIG. 9 is a set of views symbolically illustrating the principal parts of a stator for an electric rotating machine according to Embodiment 9 of the present invention.

Next, a stator for an electric rotating machine according to Embodiment 9 of the present invention will be explained with reference to FIG. 9. In Embodiments 1 to 8, the holding rings 3 and the inner frame members 5 are alternately arranged in the axis direction, spaced apart from one another by approximately the same distance; in contrast, in Embodiment 9, there is illustrated a case where the respective distances and the number of the holding rings 3 or the inner frame members 5 to be arranged are variable. In FIG. 9, the holding rings 3 are arranged in such a way that a distance L1 between the adjacent holding rings 3 in the vicinity of the corresponding end of the stator is smaller than a distance L2 between the adjacent holding rings 3 in the vicinity of the middle of the stator (i.e., L1<L2). In order to make the spring rigidity of the stator even in the axis direction, there are provided two inner frame members 5 that are close to each other. The other configurations are the same as those of Embodiment 1; therefore, explanations therefor will be omitted.

In Embodiment 9 configured as described above, because, in the case where the axis-direction distance between the holding rings 3 is partially changed, the arrangement of the inner frame members 5 is also changed, the necessary spring rigidity can be ensured; therefore, Embodiment 9 can appropriately be applied to a design change in the characteristics or the like of the stator. Additionally, in contrast to the above, the stator may be configured in such a way that the distance L1 is set longer than the distance L2, and two adjacent inner frame members 5 are arranged at each of positions corresponding to the distance L1. Moreover, the configuration of the stator can appropriately be changed, for example, there are provided a plurality of holding rings 3 that are close to one another.

In addition, in each of Embodiments 1 to 9, there has been explained a stator in which the elastic supporting members 6 are provided at four positions in the circumferential direction, the inner frame members 5 are provided at five or six positions in the axis direction, and the holding rings 3 are provided at four positions in the axis direction; however, it goes without saying that the number of the foregoing members, the positions at which the members are provided, and the like are not limited those described above. Moreover, none of the cross-sectional shapes of the holding ring 3 and the elastic supporting member 6, the joining means for the foregoing members, and the like are limited to those illustrated in each of the above embodiments. Still moreover, it goes without saying that Embodiments 1 to 9 can appropriately be combined with one another.

Various modifications and alterations of this invention will be apparent to those skilled in the art without departing from the scope and spirit of this invention, and it should be understood that this is not limited to the illustrative embodiments set forth herein.

What is claimed is:

1. A stator for an electric rotating machine, comprising:
a plurality of iron core fastening members that are provided on the outer circumferential surface of a stator iron core in such a way as to be spaced a predetermined distance apart from one another in a circumferential direction of the stator and fasten the stator iron core in an axis direction of the stator;
a plurality of holding rings that are provided on the outer circumferential surface of the stator iron core in such a way as to be spaced a predetermine distance apart from one another in the axis direction and hold the stator iron core as if to press the stator iron core toward a center portion thereof by the intermediary of the iron core fastening members;
a plurality of ring-shaped inner frame members that are protrusively provided on the inner surface of a frame that encloses the stator iron core, in such a way as to be spaced a predetermined distance apart from one another in the axis direction; and
a plurality of elastic supporting members that are each fixed to the inner circumferential surfaces of the inner frame members that are adjacent to one another, and that are each fixed to the outer circumferential surfaces of the holding rings at the middle in the axis direction, or that are each fixed to the outer circumferential surfaces of the holding rings that are adjacent to each other, and that are each fixed to the inner circumferential surfaces of the inner frame members at the middle in the axis direction.

2. The stator for an electric rotating machine according to claim 1, wherein the elastic supporting member is formed in a rectangular cross-sectional shape in which the dimension thereof in a radial direction of the stator iron core is smaller than the dimension thereof in a circumferential direction of the stator iron core.

3. The stator for an electric rotating machine according to claim 1, wherein the elastic supporting member is formed of a spring plate that is continuously elongated from the inner frame member at one end thereof in the axis direction to the inner frame member at the other end thereof.

4. The stator for an electric rotating machine according to claim 1, wherein the elastic supporting member is adhered to the respective end faces, in the axis direction, of the adjacent holding rings.

5. The stator for an electric rotating machine according to claim 4, wherein the elastic supporting members are continually provided in the axis direction.

6. The stator for an electric rotating machine according to claim 1, wherein, in the inner circumferential surface of the inner frame member, there is provided a cut that contains at least part of the elastic supporting member in the radial direction.

7. The stator for an electric rotating machine according to claim 1, wherein the elastic supporting member is adhered to the respective end faces, in the axis direction, of the adjacent inner frame members.

8. The stator for an electric rotating machine according to claim 7, wherein the elastic supporting members are continually provided in the axis direction.

9. The stator for an electric rotating machine according to claim 1, wherein the elastic supporting members are stacked on top of the other in the radial direction.

10. The stator for an electric rotating machine according to claim 9, wherein at least one of the elastic supporting members stacked on top of the other in the radial direction is formed shorter than the distance between the respective end faces, in the axis direction, of the adjacent holding rings or the distance between the respective end faces, in the axis direction, of the adjacent inner frame members.

* * * * *